United States Patent
Yoo et al.

(10) Patent No.: US 10,131,314 B2
(45) Date of Patent: Nov. 20, 2018

(54) CURTAIN AIRBAG FOR VEHICLE

(71) Applicant: Hyundai Motor Company, Seoul (KR)

(72) Inventors: Joo Seon Yoo, Whasung-Si (KR); Jae Ho Choi, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/370,123

(22) Filed: Dec. 6, 2016

(65) Prior Publication Data
US 2018/0079382 A1    Mar. 22, 2018

(30) Foreign Application Priority Data

Sep. 21, 2016 (KR) .................. 10-2016-0120460

(51) Int. Cl.
| | |
|---|---|
| *B60R 21/231* | (2011.01) |
| *B60R 21/2338* | (2011.01) |
| *B60R 21/232* | (2011.01) |
| *B60R 21/203* | (2006.01) |
| *B60R 21/233* | (2006.01) |
| *B60R 21/239* | (2006.01) |
| *B60R 21/276* | (2006.01) |
| *B60R 21/00* | (2006.01) |

(52) U.S. Cl.
CPC .......... *B60R 21/232* (2013.01); *B60R 21/203* (2013.01); *B60R 21/233* (2013.01); *B60R 21/239* (2013.01); *B60R 21/2338* (2013.01); *B60R 21/23138* (2013.01); *B60R 21/276* (2013.01); *B60R 2021/0009* (2013.01); *B60R 2021/0048* (2013.01); *B60R 2021/2395* (2013.01); *B60R 2021/23324* (2013.01); *B60R 2021/23382* (2013.01); *B60R 2021/23384* (2013.01)

(58) Field of Classification Search
CPC .... B60R 2021/23107; B60R 21/23138; B60R 21/232; B60R 21/239; B60R 21/203
See application file for complete search history.

(56) References Cited

U.S. PATENT DOCUMENTS

| | | | | |
|---|---|---|---|---|
| 6,073,960 | A * | 6/2000 | Viano | B60R 21/231 |
| | | | | 280/730.1 |
| 6,142,517 | A * | 11/2000 | Nakamura | B60R 21/23138 |
| | | | | 280/739 |
| 9,527,469 | B2 * | 12/2016 | Fukawatase | B60R 21/231 |
| 9,744,936 | B2 * | 8/2017 | Kruse | B60R 21/232 |
| 2010/0090445 | A1 * | 4/2010 | Williams | B60R 21/2338 |
| | | | | 280/728.2 |
| 2011/0241322 | A1 * | 10/2011 | Nozaki | B60R 21/23138 |
| | | | | 280/730.2 |

(Continued)

FOREIGN PATENT DOCUMENTS

| | | |
|---|---|---|
| JP | H11-222093 A | 8/1999 |
| JP | 2010-162345 A | 7/2010 |

(Continued)

*Primary Examiner* — James A English
(74) *Attorney, Agent, or Firm* — Morgan, Lewis & Bockius LLP

(57) ABSTRACT

A curtain airbag for a vehicle may include a curtain airbag cushion; a venting chamber that fills a space between an end portion of a frontal airbag on the door window side and an A pillar; and a first vent opening formed in a portion of the venting chamber, the portion being near the door window.

7 Claims, 13 Drawing Sheets

(56) References Cited

U.S. PATENT DOCUMENTS

| | | | |
|---|---|---|---|
| 2011/0298200 A1* | 12/2011 | Taniguchi | B60R 21/232 280/736 |
| 2012/0139216 A1 | 6/2012 | Scott et al. | |
| 2013/0270805 A1* | 10/2013 | Kruse | B60R 21/232 280/730.2 |
| 2014/0042732 A1* | 2/2014 | Taguchi | B60R 21/233 280/729 |
| 2014/0203541 A1* | 7/2014 | Wei | B60R 21/213 280/730.2 |
| 2014/0203542 A1* | 7/2014 | Fukawatase | B60R 21/239 280/730.2 |
| 2014/0217710 A1* | 8/2014 | Fukawatase | B60R 21/233 280/730.2 |
| 2014/0239619 A1* | 8/2014 | Fukawatase | B60R 21/232 280/730.2 |
| 2016/0185314 A1* | 6/2016 | Kawamura | B60R 21/232 280/728.2 |
| 2016/0229370 A1* | 8/2016 | Hampson | B60R 21/232 |
| 2017/0072896 A1* | 3/2017 | Fukawatase | B60R 21/232 |
| 2017/0120856 A1* | 5/2017 | Sumiya | B60R 21/233 |

FOREIGN PATENT DOCUMENTS

| | | |
|---|---|---|
| JP | 2012-020719 A | 2/2012 |
| JP | 2014-151676 A | 8/2014 |
| KR | 10-2004-0079246 A | 9/2004 |
| KR | 10-2016-0022995 A | 3/2013 |
| KR | 10-2013-0034726 A | 4/2013 |
| KR | 10-2013-0097226 A | 9/2013 |
| WO | WO 2012-091656 A1 | 7/2012 |
| WO | WO 2013/108474 A1 | 7/2013 |

* cited by examiner

CURTAIN AIRBAG FOR VEHICLE

CROSS REFERENCE TO RELATED APPLICATION

The present application claims priority to Korean Patent Application No. 10-2016-0120460, filed Sep. 21, 2016, the entire contents of which is incorporated herein for all purposes by this reference.

BACKGROUND OF THE INVENTION

Field of the Invention

The present invention relates to a curtain airbag and more particularly to a curtain airbag for preventing a driver's body from directly striking the interior of a vehicle and preventing injury to a driver attributable to head rotation.

Description of Related Art

Regarding vehicles, with growing interest in safety as well as diverse functionality and convenience, safety devices for protecting occupants in a vehicle crash event are becoming increasingly important. Among the safety devices, an airbag system is a key protection device and it protects occupants by distributing impact in a vehicle crash event.

In addition to frontal airbags installed in front of driver's and passenger's seats, there are many types of airbags, for example, a side airbag or a curtain airbag that deploys to cover side windows in the event of a side impact crash. Side impact crash-related airbag systems are categorized into curtain airbags for primarily protecting an occupant's head and side airbags for primarily protecting an occupant's torso.

A curtain airbag typically extends along the side edge of a roof panel. That is, it extends in the longitudinal direction of a vehicle. When air or gas is introduced into a curtain airbag through an inflator, the curtain airbag deploys between door windows and occupants to protect the heads of occupants seated in the front and back seats.

However, conventional two-dimensional flat curtain airbags cannot perfectly protect occupants in the event of an oblique impact crash, unfortunately allowing the occupant's body to directly strike the A pillar or failing to prevent the occupant's head from sliding along the surface of a frontal airbag that inflates at the time of a crash, which results in the occupant's injury attributable head rotation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a curtain airbag that can prevent an occupant's head from slipping through a gap between a curtain airbag and a frontal airbag only to strike an A pillar in an oblique impact crash event, thus preventing an occupant's injury attributable to head rotation.

According to one aspect, there is provided a curtain airbag for a vehicle, including: a curtain airbag cushion that is deployed between a door window and an occupant; a venting chamber that is disposed between a front end portion of the curtain airbag cushion and an A pillar of a vehicle, is thicker than the curtain airbag cushion, and fills a space between an end portion of a frontal airbag, the end portion being near the door window, and the A pillar when the venting chamber is deployed; and a first vent hole formed in a portion of the venting chamber, the portion being near the door window.

The curtain airbag for a vehicle may further includes a first tether that is connected between the first vent hole and a portion of the inside surface of the first venting chamber, wherein the first tether is loosened and thus the first vent hole is opened when external force is applied to a portion of the venting chamber, the portion being connected to the first tether.

The first tether may be a panel tether and may be mounted to extend in a vertical direction in the vehicle.

The vent hole may be formed in the venting chamber, in a position that is near the door window and does not come into contact with the A pillar.

The curtain airbag for a vehicle may further include a second vent hole through which the curtain airbag cushion and the venting chamber communicate with each other.

The second vent hole may be an active vent hole that is opened or closed under control.

The curtain airbag for a vehicle may further include: a first tether cutter; a cover for opening or closing the second vent hole; and a second tether that is connected between the cover and the first tether cutter, wherein the second vent hole remains open for a first time and is then closed by the cover when the second tether is cut by the first tether cutter.

The curtain airbag for a vehicle may further include a third tether that is connected between a center portion of the first tether and a portion of the inside surface of the venting chamber, wherein an angle between fractions of the first tether disposed on both sides of a position at which the first tether and the third tether are connected to each other is an obtuse angle, and an angle between a portion of the first tether, the portion being near the first bent hole, and the third tether is an obtuse angle.

The curtain airbag for a vehicle may further include: a fourth tether; and a fifth tether that passes through the fourth tether and has a first end portion connected to a portion of the inside surface of the venting chamber and a second end portion connected to a portion of the inside surface of the venting chamber, wherein the connected portion of the second end portion is in the back of the connected portion of the first end portion, and wherein the fourth and fifth tethers are loosened and thus the first vent hole is opened when external force is applied to a portion of the venting chamber, the portion being connected to the fifth tether.

The portion of the inside surface of the venting chamber connected to the first tether, the third tether, or the fifth tether may be disposed in a rear portion of the venting chamber in an anteroposterior direction.

The curtain airbag for a vehicle may further include a sixth tether that is disposed to pass through the second vent hole, is connected between the cover and the first vent hole, and is longer than a straight-line distance between the first vent hole and the second vent hole, wherein the second vent hole is closed and the first vent hole is opened when the second tether is cut by the first tether cutter.

The curtain airbag for a vehicle may further include: a second tether cutter; and a seventh tether that is disposed to pass through the second vent hole and is connected between the second tether cutter and the first vent hole, wherein the second vent hole remains open for a first time and is then closed by the cover when the second tether is cut by the first tether cutter, and the first tether is opened when the seventh tether is cut by the second tether cutter.

The curtain airbag for a vehicle may further include an eighth tether that has a panel shape, is disposed between a door window and the venting chamber, and has a first end portion which is combined with a portion at which the curtain airbag cushion and the venting chamber are connected to each other and a second end portion which is combined with the A pillar of the vehicle.

The curtain airbag for a vehicle according to an exemplary embodiment of the present invention prevents an occupant's head from directly striking a vehicle's frame even in the event of an oblique impact crash and also prevents an occupant's head from rolling and sliding along the surface of a frontal airbag, thus reducing injury to an occupant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
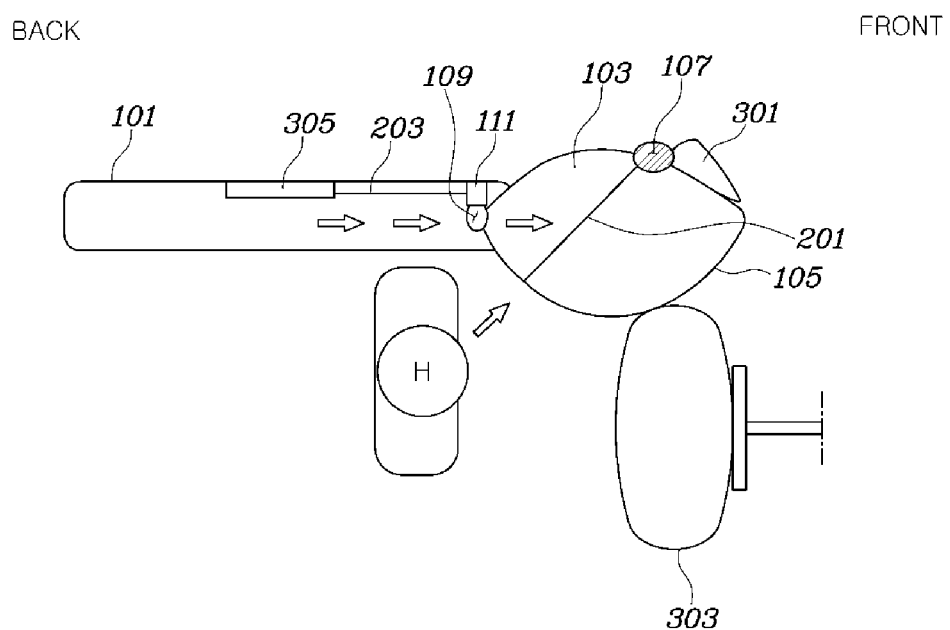
FIG. 1A and FIG. 1B are schematic diagrams illustrating a curtain airbag for a vehicle according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described with reference to the accompanying drawings.

Figure 1B:
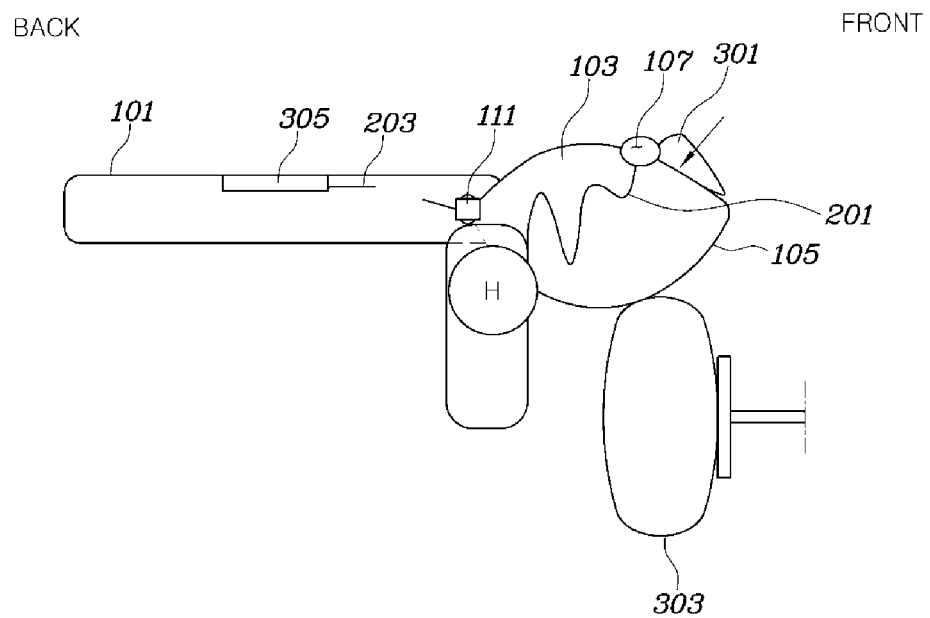
Figure 2A:
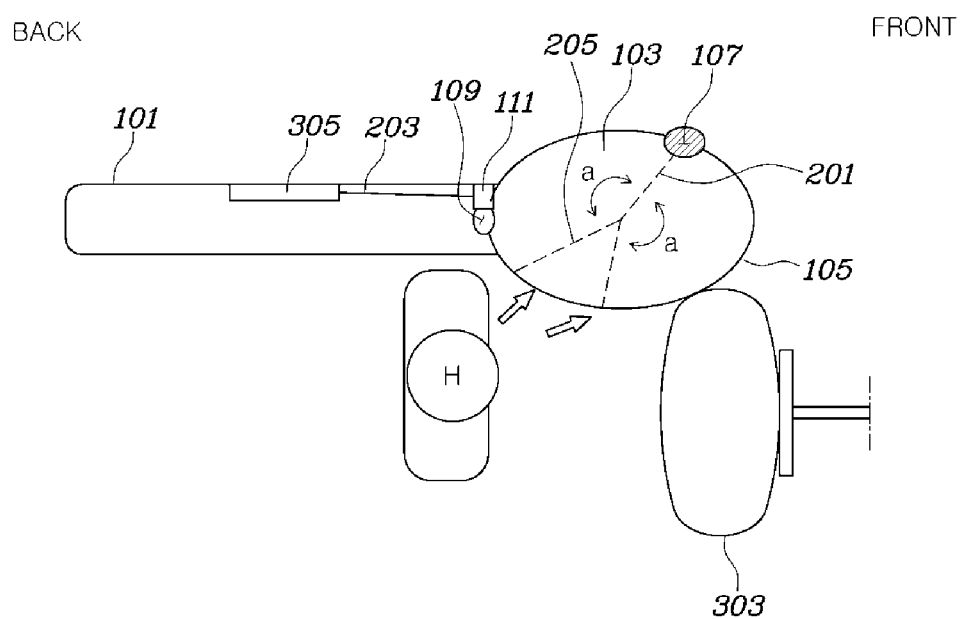
FIG. 2A, FIG. 2B and FIG. 2C are schematic diagrams illustrating a curtain airbag for a vehicle according to various exemplary embodiments of the present invention.
Figure 2B:
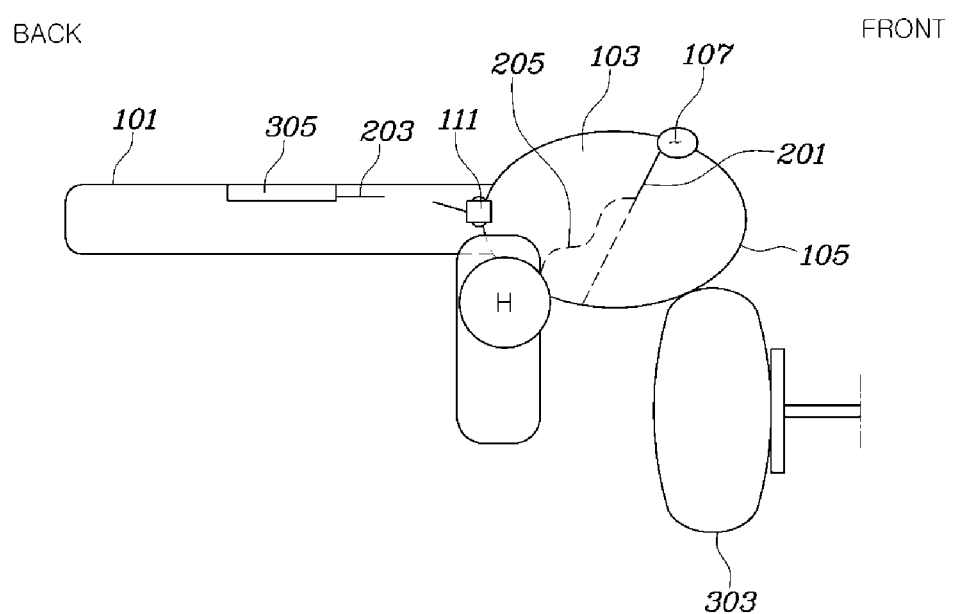
Figure 2C:
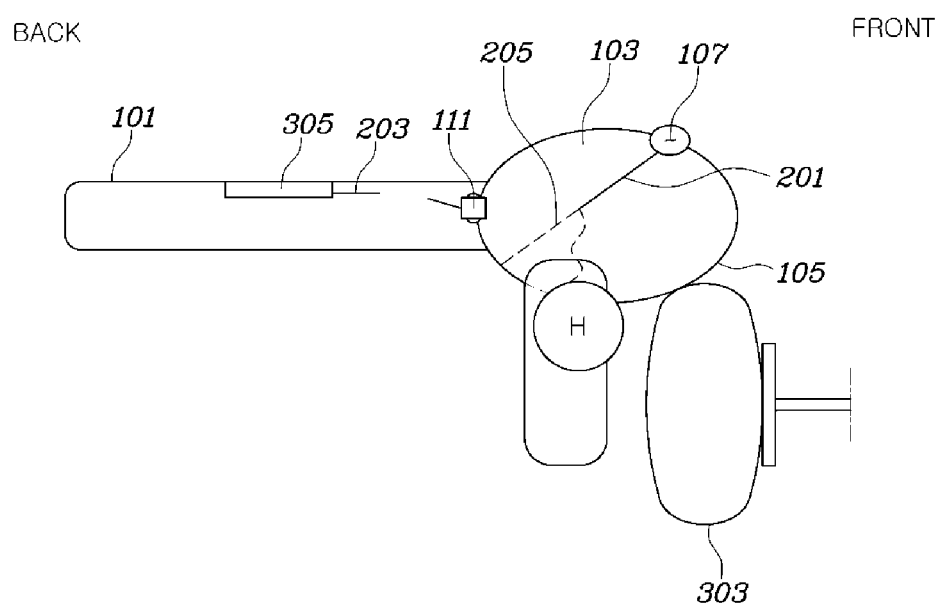
Figure 3A:
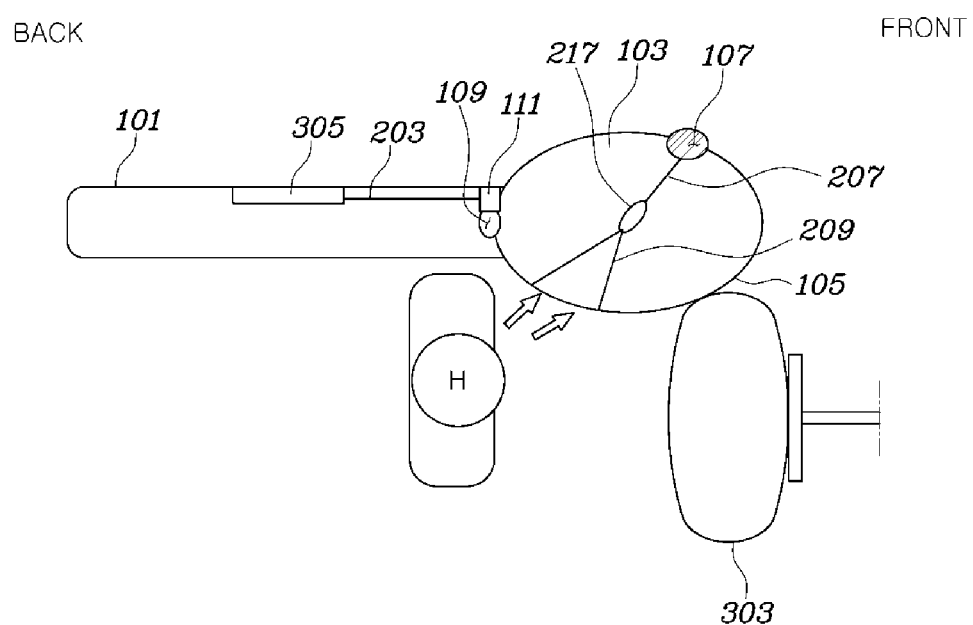
FIG. 3A, FIG. 3B and FIG. 3C are schematic diagrams illustrating a curtain airbag for a vehicle according to various exemplary embodiments of the present invention.
Figure 3B:
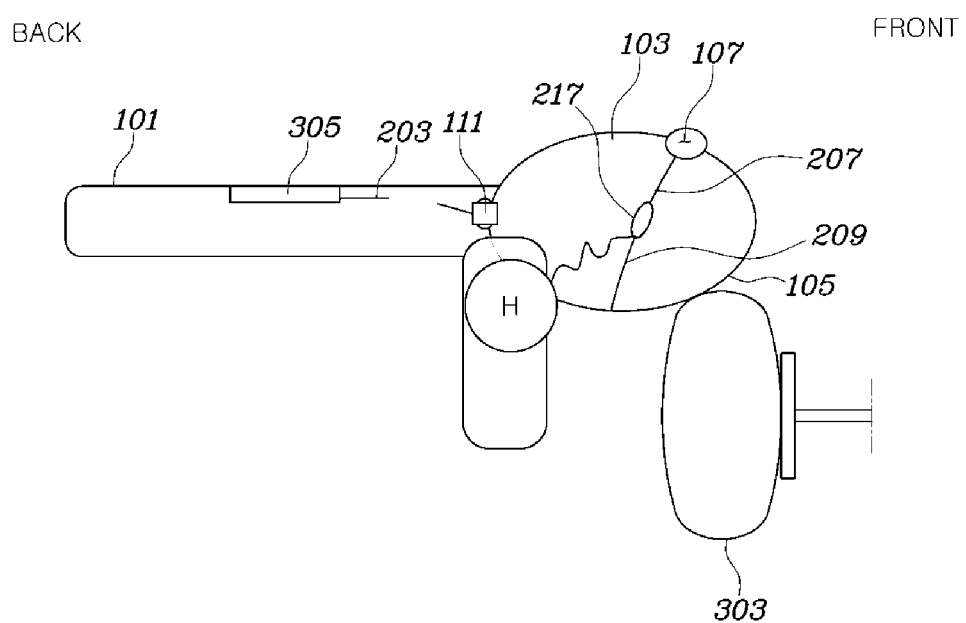
Figure 3C:
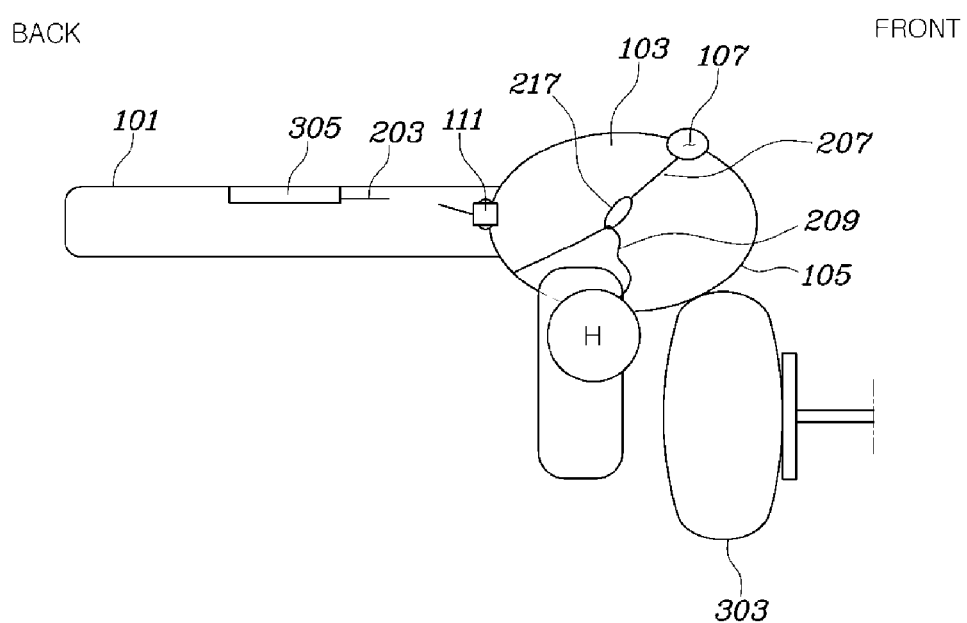
Figure 4A:
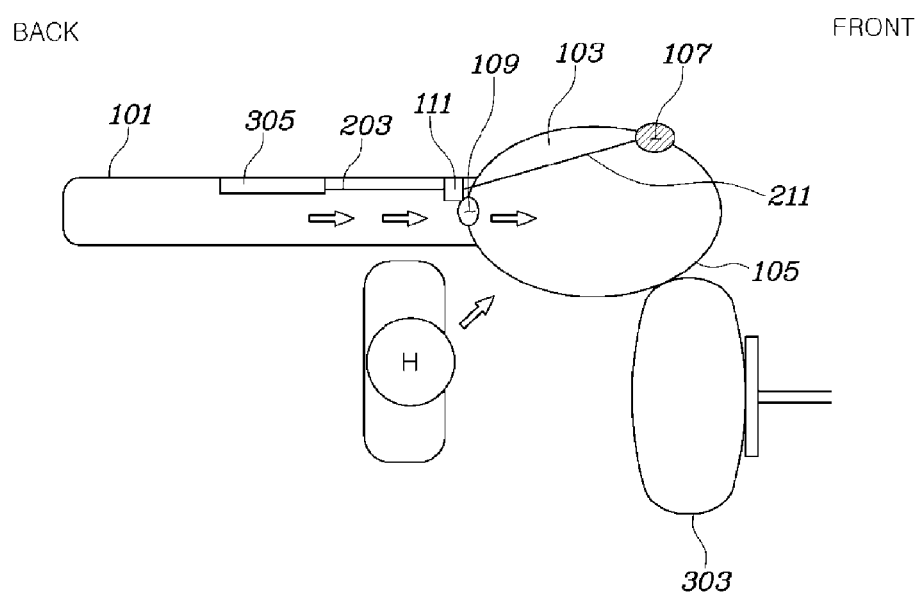
FIG. 4A and FIG. 4B are schematic diagrams illustrating a curtain airbag for a vehicle according to various exemplary embodiments of the present invention.
Figure 4B:
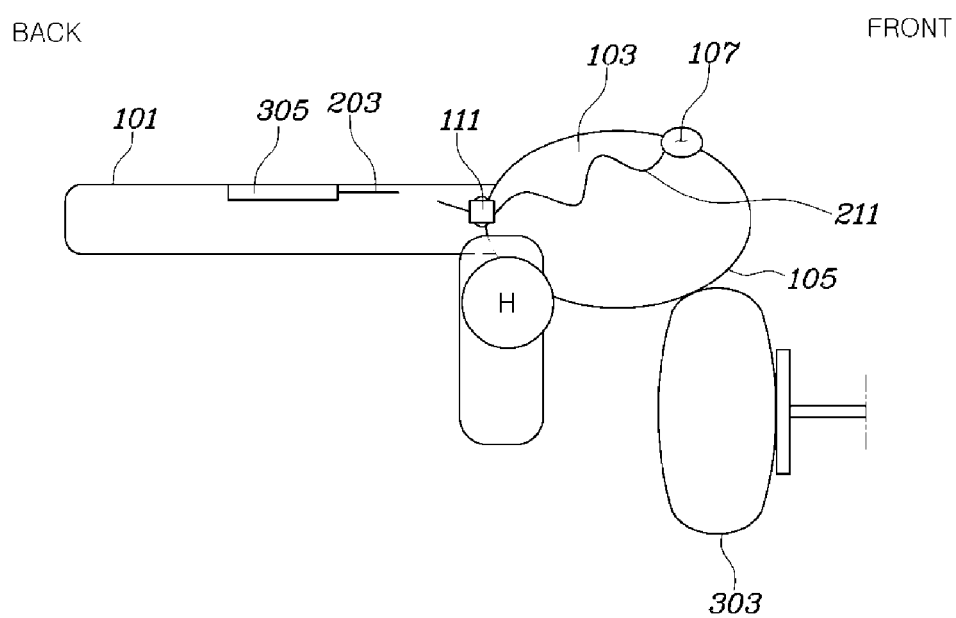
Figure 5A:
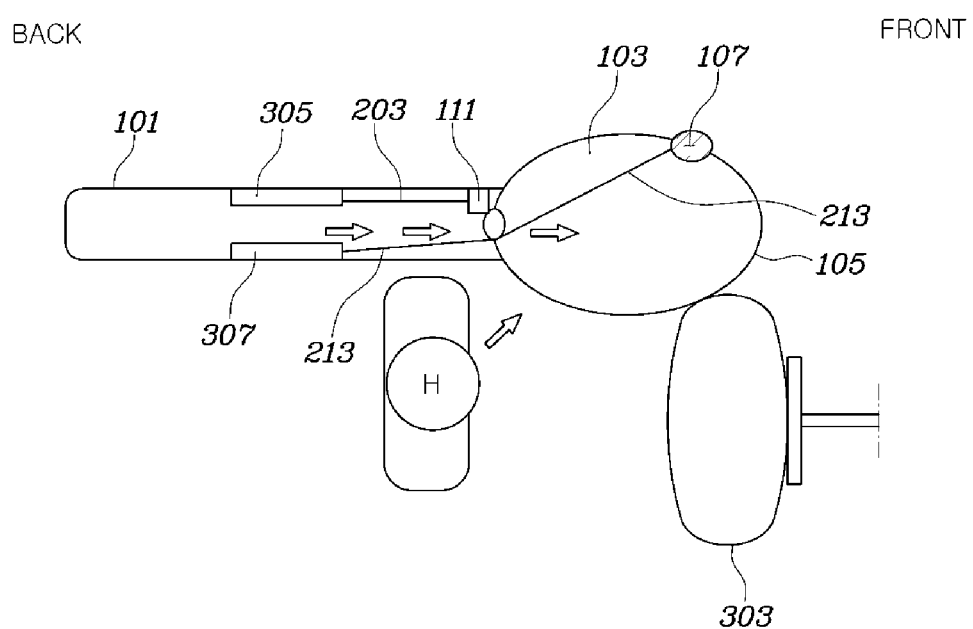
FIG. 5A and FIG. 5B are schematic diagrams illustrating a curtain airbag for a vehicle according to various exemplary embodiments of the present invention.
Figure 5B:
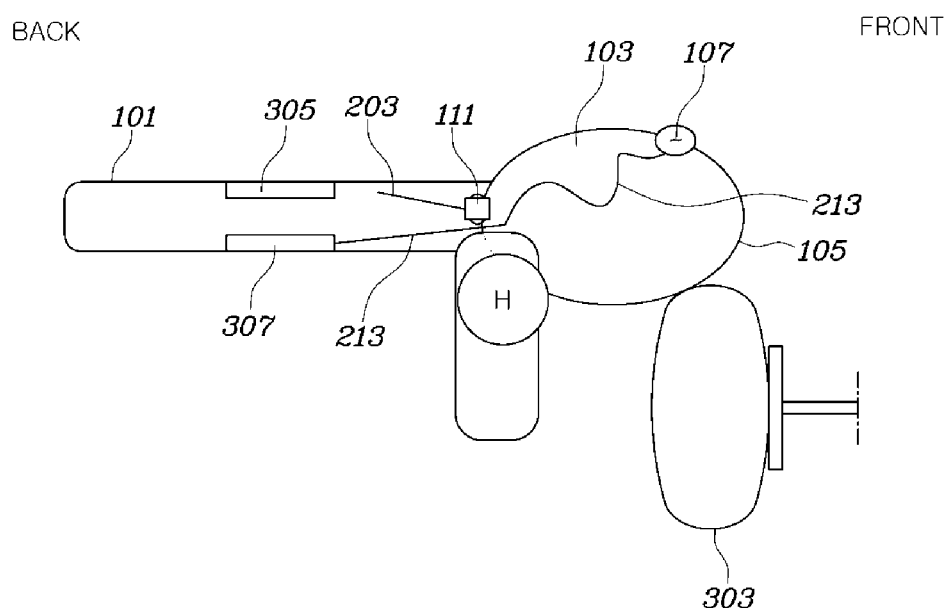
Figure 6:
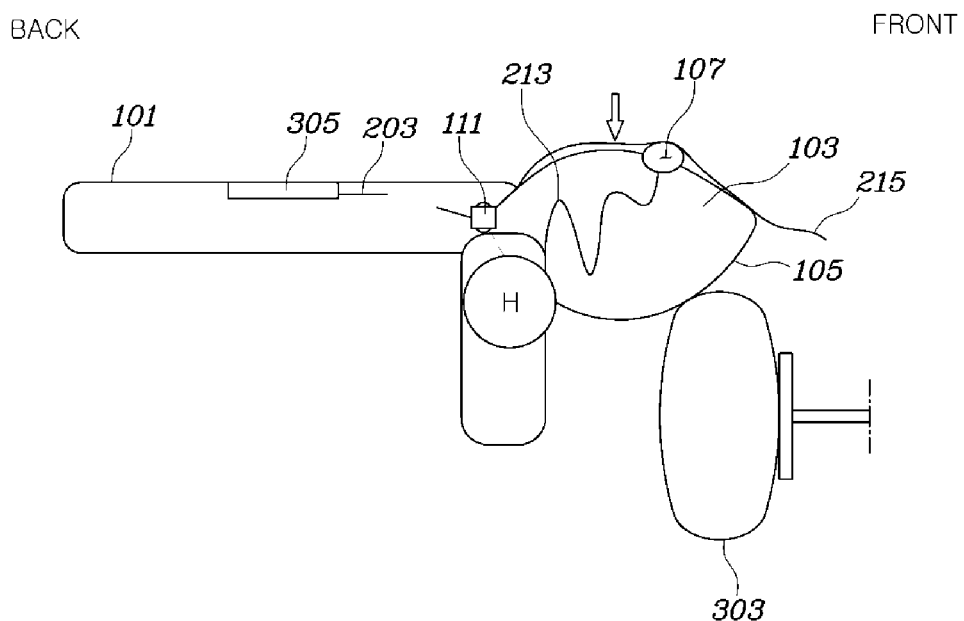
FIG. 6 is a schematic diagram illustrating an eighth tether according to one exemplary embodiment of the present invention.

FIG. 1A and FIG. 1B are schematic diagrams illustrating a curtain airbag for a vehicle according to various exemplary embodiments of the present invention; FIG. 2A, FIG. 2B and FIG. 2C are schematic diagrams illustrating a curtain airbag for a vehicle according to various exemplary embodiments of the present invention; FIG. 3A, FIG. 3B and FIG. 3C are schematic diagrams illustrating a curtain airbag for a vehicle according to various exemplary embodiments of the present invention; FIG. 4A and FIG. 4B are schematic diagrams illustrating a curtain airbag for a vehicle according to various exemplary embodiments of the present invention; FIGS. 5A and 5B are schematic diagrams illustrating a curtain airbag for a vehicle according to various exemplary embodiments of the present invention; and FIG. 6 is a schematic diagram illustrating an eighth tether according to one exemplary embodiment of the present invention.

According to embodiments of the present invention, a curtain airbag for a vehicle includes: a curtain airbag cushion 101 that deploys in a space between a door window and an occupant; a venting chamber 103 that is disposed between a front end portion of the curtain airbag cushion 101 and an A pillar 301 of a vehicle, is thicker than the curtain airbag cushion 101, and is mounted to fill a gap between an end portion (door-side end portion) of a frontal airbag 303 and a door window or the A pillar 301; and a first vent hole 107 formed in a portion of the venting chamber 103, the portion being near the door window.

To simplify the description of the embodiments of the present invention, the following description will be made with respect to a relation between the frontal airbag 303 mounted in front of a driver's seat and the curtain airbag cushion 101, but the same structure and operation may apply to a relation between the frontal airbag 303 mounted in front of a passenger's seat and the curtain airbag cushion 101.

Curtain airbags typically extend in the longitudinal direction of a vehicle, along one side edge portion of a roof panel. A curtain airbag inflates to be deployed between a door window and a driver (or passenger), protecting the driver's (or passenger's) head and preventing the driver (or passenger) from being ejected from a vehicle through a door window in a vehicle crash event.

Conventionally, in the event of a front impact crash or a side impact crash of a vehicle, a conventional curtain airbag and a frontal airbag 303 protect a driver together. However, in the event of an oblique impact crash, there is likelihood that the conventional curtain airbag and frontal airbag cannot properly protect a driver due to flailing of his or her body.

To be specific, it may happen that a driver's head H slips through between the frontal airbag 303 and the curtain airbag and thus strikes the A pillar 301 or that the driver's head H rolls or rotates by being hit by the frontal airbag due to the inflation pressure of the frontal airbag 303 during inflation of the frontal airbag 303, resulting in the driver's brain damage or neck injury.

Accordingly, according to one embodiment, as illustrated in FIG. 1A and FIG. 1B, the venting chamber 103 is mounted at the front end portion of the curtain airbag cushion 101. The venting chamber 103 is formed to be thicker than the front end portion of the curtain airbag cushion 101 to fill a gap, between the front end portion of the frontal airbag and the curtain airbag, through which a driver's head H may pass through when there is the gap. Therefore, the driver's head cannot pass through between the front end portion of the frontal airbag and the curtain airbag due to the presence of the venting chamber 103, so that the driver's head H may not strike the A pillar 301.

On the other hand, inflation of the venting chamber 103 having a relatively large volume requires a high inflation pressure. Therefore, the driver's head H may be hit by the venting chamber 103 due to the high inflation pressure during inflation of the venting chamber 103, which results in driver's brain damage or neck injury.

To solve this problem, according to an exemplary embodiment of the present invention, as illustrated in FIG. 1A and FIG. 1B, the first vent hole 107 is opened to lower the pressure of the venting chamber 103 when the driver's head H strikes the venting chamber 103, so that the driver's brain damage or neck injury can be prevented.

A first tether 201 is mounted in the venting chamber 103 and connected between the first vent hole 107 and a portion of the inside surface 105 of the venting chamber 103. Thus, in a case in which external force is applied to a portion of the venting chamber, at which the first tether 201 is connected to the inside surface 105, when the driver's head strikes the venting chamber 103, the first tether 201 is loosened and thus the first vent hole 107 is opened.

The first tether 201 may be a panel tether extending in the vertical direction in a vehicle.

In the instant case, even when the heads H of drivers of different heights strike different portions of the venting chamber 103, the first vent hole 107 can be easily opened. Third to seventh tethers described below also may be a panel tether and extend in the vertical direction in a vehicle, like the first tether 201.

In the venting chamber 103, the first vent hole 107 may be formed in a portion that is near the door window and that is unlikely to come into contact with the A pillar 301.

This is because the A pillar 301 can block the first vent hole 107 when the first vent hole 107 comes into contact with the A pillar 301 as illustrated in FIG. 1B. When the first vent hole 107 is blocked, air or gas cannot be discharged from the venting chamber 103 through the vent hole 107. Therefore, the first vent hole 107 is formed in the portion that is not likely to come into contact with the A pillar 301. In addition, the A pillar 301 may function as a support when the driver's head H strikes the venting chamber 103. Therefore, when the driver's head puts pressure on the venting chamber 103, the air or gas can be discharged from the inside of the venting chamber 103 while the venting chamber 103 is being pushed toward the A pillar 301 by the driver's head H.

The curtain airbag according to an exemplary embodiment of the present invention may further include a second vent hole 109 through which the curtain airbag cushion 101 and the venting chamber 103 communicate with each other.

The second vent hole 109 may be an active vent hole that can be opened or closed under control.

A dedicated inflator may be provided for inflation of the venting chamber 103. However, this leads to an increase in the cost of an airbag and is ineffective in terms of packaging. Therefore, both the curtain airbag cushion 101 and the venting chamber 103 can be inflated by one inflator.

Curtain airbags do not discharge air or gas after a vehicle crash unlike other airbags mounted in a vehicle but still remain inflated, to restrain an occupant so that the occupant may not be ejected from the vehicle through a broken window.

Therefore, according to an exemplary embodiment of the present invention, to inflate both of the curtain airbag cushion 101 and the venting chamber 103 with only one inflator, a second vent hole 109 is formed as illustrated in FIG. 1A and FIG. 1B. In the instant case, the second vent hole 109 is provided as an active vent hole to prevent the air pressure in the curtain airbag cushion 101 from being excessively lowered when the first vent hole 107 of the venting chamber 103 is opened. Thus, the second vent hole 109 is closed when a predetermined time period elapses.

A description about a method of closing the second vent hole 109 will be given below.

The curtain airbag according to an exemplary embodiment of the present invention may further include a first tether cutter 305, a cover 111 for covering the first vent hole 109, and a second tether 203 that is connected between the cover 111 and the first tether cutter 305. When the second tether 203 is cut by the first tether cutter 305 in a state in which the second vent hole 109 is open, the second vent hole 109 is closed by the cover 111.

The point of time when the second tether 203 is cut by the first tether cutter 305 may be when the driver's head H initially hits the venting chamber 103 after occurrence of an oblique impact crash. However, a specific point of time at which the second tether 203 is cut by the first tether cutter 305 may vary according to the kinds of vehicles and may be determined through experiments.

Although not illustrated in the drawing, activation of the first tether cutter 305 and a second tether cutter 307 described below may be controlled by a controller, based on impact-related information that is input from various sensors including an engine control unit (ECU).

Specific criteria for opening the first vent hole 107 when the driver's head H strikes the venting chamber 103 are as follows:

when the curtain airbag additionally includes a third tether 205 that is connected between a center portion of the first tether 201 and a portion of the inside surface 105 of the venting chamber 103, an angle "a" between two fractions of the first tether 201 disposed on both sides of a position at which the first tether 201 and the third tether 205 are connected to each other is an obtuse angle and an angle "a" between a portion of the first tether, which is near the first vent hole 107, and the third tether 205 is an obtuse angle.

Referring to FIGS. 2A through 2C, the area of a portion of the inside surface 105, which is linked with the first vent hole 107 by the first tether 201 and the third tether 205, is increased. This construction is to open the first vent hole 107 in various conditions because the portion of the venting chamber 103 with which the driver's head H comes into contact varies according to various factors including the severity of impact.

when the venting chamber 103 is fully opened in the state in which an angle "a" between two fractions of the first tether 201 disposed on both sides of a position at which the first tether 201 and the third tether 205 are connected to each other, and an angle "a" between a portion of the first tether, which is near the first vent hole 107, and the third tether 205, are an obtuse angle, the closed state of the first vent hole 107 is maintained. For this reason, when the driver's head strikes any portion of the venting chamber 103, either the first tether 201 or the third tether 205 is loosened and thus the first vent hole 107 can be opened.

The curtain airbag according to an exemplary embodiment of the present invention may further include: a fourth tether 207 that has a first end portion connected to the first vent hole 107 and a second end portion provided with a ring 217; and a fifth tether 209 that passes through the ring 217 of the fourth tether 207 and has a first end portion connected to a portion of the inside surface 105 of the venting chamber 103 and a second end portion connected to a portion of the inside surface 105 of the venting chamber, wherein the connected portion of the second end portion is disposed in the back of the connected portion of the first end portion. When external force is applied to an area where a portion of the inside surface 105 of the venting chamber 103 and the fifth tether 209 are connected to each other, the fourth tether 207 and the fifth tether 209 are loosened and thus the first vent hole 107 can be opened.

The operation principle of the fourth and fifth tethers is basically the same as that of the first and third tethers 201 and 205. Referring to FIGS. 3A through 3C, the fifth tether 209 is formed to freely move through the ring 217 provided to the second end portion of the fourth tether 207. In addition, when the venting chamber 103 is fully opened in a state in which the angle "a" between the fourth tether 207 and the fifth tether 209 is an obtuse angle, the closed state of the first vent hole 107 is maintained. At this point, when the driver's head H strikes the venting chamber 103, since the lengths of the fifth tether 205 are disproportional with respect to the ring 217, the total length of the tether that is connected between the first vent hole 107 and a portion of the inside surface 105 of the venting chamber 103 becomes longer than the straight-line distance between the inside surface 105 of the venting chamber 103 and the first vent hole 107. Therefore, the tether is loosened and thus the first vent hole 107 is opened.

The portion of the inside surface 105 of the venting chamber 103 to which the first tether 201, the third tether 205, or the fifth tether 209 is connected is disposed in a rear portion of the venting chamber 103 in the anteroposterior direction of the venting chamber 103.

The portion of the inside surface 105 of the venting chamber 103 to which the first tether 201, the third tether 205, or the fifth tether 209 is connected is a portion with which the driver's head H may come into contact in a vehicle crash event. That is, the portion serves as a trigger to open the vent hole 107 when the driver's head H strikes the venting chamber. Taking into account the fact that the venting chamber 103 is an element that fills a gap between the frontal airbag 303 and the A pillar 301 or the door window and considering the venting chamber's positional interference with the frontal airbag 303, a portion with which the driver's head is most likely to come into contact is determined as the trigger.

The curtain airbag according to an exemplary embodiment of the present invention may further include a sixth tether 211 that is disposed to pass through the second vent hole 109, is connected between the cover 111 and the first vent hole 107, and is longer than the straight-line distance between the first vent hole 107 and the second vent hole 109. When the second tether 203 is cut by the first tether cutter 305, the second vent hole 109 is closed but the first vent hole 107 may be opened.

The curtain airbag cushion 101 maintains its inside pressure even after a vehicle crash event to prevent an occupant from being ejected from a vehicle through a window. According to an exemplary embodiment of the present invention, when a predetermined time period elapses after the curtain airbag starts inflating, the second vent hole 109 is closed to maintain the inside pressure of the curtain airbag cushion 101. As to the venting chamber 103, the air or gas in the venting chamber 103 is discharged after the elapse of a predetermined time to prevent injury to a driver's head H.

Here, the point of time at which the second vent hole 109 is closed to maintain the inside pressure of the curtain airbag cushion 101 and the point of time at which the first vent hole 107 is opened after the driver's head H strikes the venting chamber 103 are substantially coincident. Accordingly, a time that it takes for the driver's head to strike the venting chamber 103 after the occurrence of an oblique impact crash of a vehicle is estimated, and the second tether 203 is cut by the first tether cutter 305 when the estimated time elapses after the event of the oblique impact crash, so that the second vent hole 109 can be closed and the first vent hole 107 can be opened at the desired point.

Referring to FIGS. 4A and 4B, the second tether 203 is connected between the first tether cutter 305 and the cover 111, the second vent hole 109 is open, the sixth tether 211 is longer than the straight-line distance between the first vent hole 107 and the second vent hole 109, and the first vent hole 107 is closed. That is, the length of the sixth tether 211 is longer than the straight-line distance between the first vent hole 107 and the second vent hole 109 by a predetermined length corresponding to a decreased length of the second tether 203 that is decreased to open the second vent hole 109.

In the instant case, when an oblique impact crash occurs and the second tether 203 is cut by the first tether cutter, the cover 111 closes the second vent hole 109 due to the inside pressure of the curtain airbag cushion 101, and the sixth tether 211 is loosened to open the first vent hole 107, lowering the inside pressure of the venting chamber 103.

In this way, it is possible to interlockingly control the closing of the second vent hole 109 and the opening of the first vent hole 107 with only one actuator (i.e., the first tether cutter 305).

The curtain airbag according to an exemplary embodiment of the present invention may further include a second tether cutter 307 and a seventh tether 213 that is disposed to pass through the second vent hole 109 and is connected between the second tether cutter 307 and the first vent hole 107. The second vent hole 109 remains open for a predetermined time period and is then closed by the cover 111 when the second tether 203 is cut by the first tether cutter 305. On the other hand, the first vent hole 107 may be opened when the seventh tether 213 is cut by the second tether cutter 307.

The operation principle of the present exemplary embodiment is basically similar to that of the control for closing the second vent hole 109 and opening the first vent hole 107 using the second tether 203 and the sixth tether 211. However, according to the present exemplary embodiment, the opening of the first vent hole 107 is controlled using the seventh tether 213 and the second tether cutter 307 as illustrated in FIGS. 5A and 5B, to precisely and separately control the point of time at which the second vent hole 109 is closed and the point of time at which the first vent hole 107 is opened. That is, the control is made such that the second vent hole 109 is covered by the cover 111 when the second tether 203 is cut by the first tether cutter 305 and the first vent hole 107 is opened when the seventh tether 213 is cut by the second tether cutter 307.

According to the present exemplary embodiment, it is possible to separately control discharging of air or gas from the curtain airbag cushion 101 and from the venting chamber 103. Therefore, it is possible to provide a curtain airbag that optimally operates and that optimizes driver protection performance, according to the kinds of vehicles.

The curtain airbag according to an exemplary embodiment of the present invention may further include the eighth tether 215 that is panel-shaped, disposed between the door window and the venting chamber 103, and has a first end portion combined with a connection area of the curtain airbag cushion 101 and the venting chamber 103 and a second end portion combined with the A pillar 301.

As mentioned above, the curtain airbag maintains its inside pressure after inflating, to prevent an occupant from being ejected from a vehicle through a broken door window. On the other hand, to reduce impact which may be applied to a driver's head H, air or gas is discharged from the venting chamber 103 so that the inside pressure of the venting chamber 103 can be reduced when the driver's head strikes the venting chamber 103. However, this may negatively affect an airbag's function of restraining an occupant not to be ejected from a vehicle.

Therefore, according to an exemplary embodiment of the present invention, as illustrated in FIG. 6, the eighth tether 215 having a panel shape is mounted to surround and support a portion of the venting chamber 103, so that the portion of the venting chamber 103 can prevent an occupant from being ejected from a vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A curtain airbag for a vehicle, comprising:
    a curtain airbag cushion that is deployed between a door window and an occupant;
    a venting chamber that is disposed between a front end portion of the curtain airbag cushion and an A pillar of the vehicle, is thicker than the curtain airbag cushion, and fills a space between an end portion of a frontal airbag, the end portion being adjacent to the door window and the A pillar when the venting chamber is deployed;
    a first vent opening formed in a portion of the venting chamber, the portion being adjacent to the door window; and
    a first tether that is connected between the first vent opening and an inside surface of the venting chamber, wherein the first tether is loosened and thus the first vent opening is configured to be opened when an external force is applied to a portion of the venting chamber, the portion being connected to the first tether.

2. The curtain airbag for the vehicle according to claim 1, wherein the first tether is a panel tether and is mounted to extend in a vertical direction in the vehicle.

3. The curtain airbag for the vehicle according to claim 1, wherein the first vent opening is formed in the venting chamber, in a position that is adjacent to the door window and does not contact with the A pillar.

4. The curtain airbag for the vehicle according to claim 1, further including a second vent opening through which the curtain airbag cushion and the venting chamber communicate with each other.

5. The curtain airbag for the vehicle according to claim 4, wherein the second vent opening is a vent opening that is configured to be opened or closed under control.

6. The curtain airbag for the vehicle according to claim 4, further including:
    a first tether cutter;
    a cover for opening or closing the second vent opening; and
    a second tether that is connected between the cover and the first tether cutter,
    wherein the second vent opening continues open for a first predetermined time and is then closed by the cover when the second tether is cut by the first tether cutter.

7. The curtain airbag for the vehicle according to claim 1, further including a third tether that is connected between a center portion of the first tether and a portion of the inside surface of the venting chamber,
    wherein an angle between fractions of the first tether disposed on a first side and a second side of a position at which the first tether and the third tether are connected to each other is an obtuse angle and wherein an angle between a portion of the first tether, the portion being adjacent to the first bent opening, and the third tether is an obtuse angle.

* * * * *